May 9, 1933.  C. S. BRAGG ET AL  1,908,400
BRAKE SYSTEM FOR AUTOMOTIVE VEHICLES
Original Filed March 28, 1928
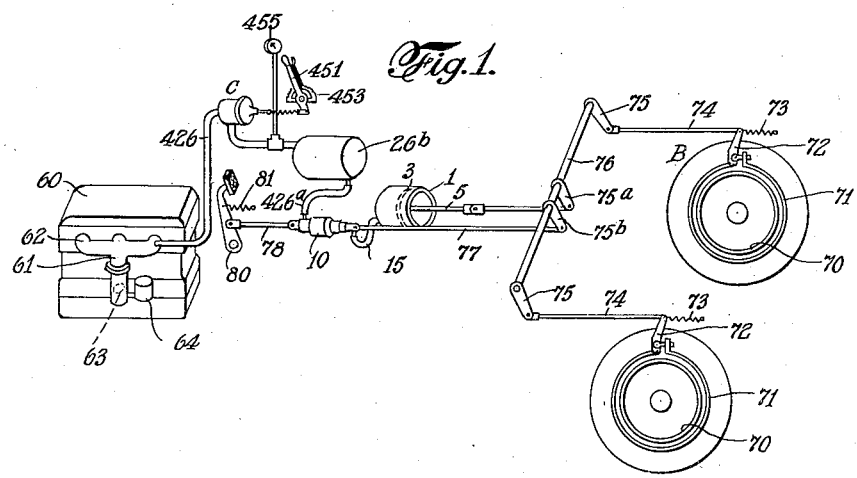
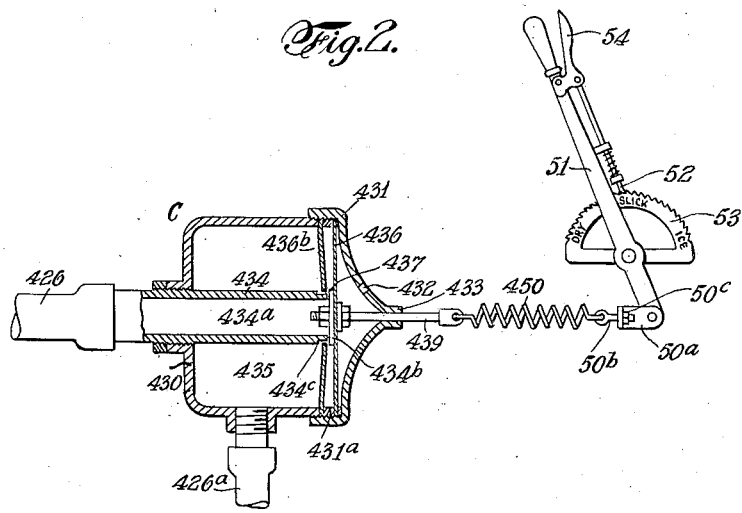
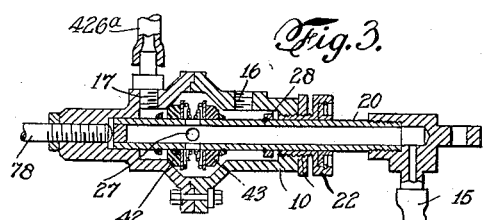

Patented May 9, 1933

1,908,400

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Original application filed March 28, 1928, Serial No. 265,255. Divided and this application filed April 16, 1929. Serial No. 355,619.

Our invention consists in the novel features hereinafter described, reference being had to the accompanying which shows an embodiment of the invention selected by us for purposes of illustration, and the said invention is fully disclosed in the following description and claims.

Our present invention relates to vacuum or suction actuated brake systems for automotive vehicles, in which the suction or rarification is conveniently obtained by a connection to the throttle controlled portion of the suction passage of an internal combustion engine which drives the vehicle, and in which the higher pressure fluid, usually atmospheric air, is at a substantially constant pressure, and it consists in the provision of the herein described pressure regulating check valve interposed between the said portion of the suction passage of the engine and the controlling valve mechanism for the suction actuated device for automatically maintaining a constant and predetermined degree of rarification available for the operation of the suction actuated device, and providing means under the control of the operator for varying said constant degree of rarification from time to time to meet changes in the coefficient of friction between the wheel tires and the road surface, due to variations in road conditions and also to variations in the load of the vehicle, so that the operator may be enabled to apply the brake mechanisms with the maximum force of the actuator without locking the wheels. The pressure regulating valve also functions as a check valve to prevent variations in the degree of rarification which occur in the intake manifold from being transmitted through the controlling valve mechanism to the power actuator when the latter is connected with the suction passage to apply the brakes by power, where the piston of the actuator is normally submerged in atmosphere in the released position and the actuator is not provided with a vacuum storage reservoir. The apparatus further serves as a check valve if a vacuum storage tank is used, with the type of actuator referred to, to maintain a vacuum storage in the tank sufficient to insure an emergency application of the brakes should the motor stall. Also where the actuator piston is submerged in vacuum in the released position, as shown for example in our former Letters Patent of the United States No. 1,583,117 dated May 4, 1926, in which case the portion of the actuator cylinder forward of the piston serves as a vacuum storage space, the apparatus performs a like function. The apparatus also serves as a check valve to prevent gaseous mixture from the suction passage which might otherwise be drawn into the suction pipe by reason of the fluctuations in the degree of rarification within the suction passage due to the opening and closing of the throttle valve, from passing into the suction actuated device and its controlling valve mechanism where it might deteriorate the sealing members and possibly result in a destructive explosion in case of backfire.

Our invention also comprises certain novel features of construction and combination of parts hereinafter fully described and particularly pointed out in the claims.

This application is a division of our former application for Letters Patent of the United States filed March 28, 1928 and given Serial No. 265,255.

In the accompanying drawing,

Fig. 1 is a diagrammatic view of an installation of brake mechanism in an automotive vehicle showing our invention embodied therein, in connection with an actuator, the piston of which is submerged in atmosphere when in the released position.

Fig. 2 is an enlarged sectional view of the pressure regulating check valve shown in Fig. 1.

Fig. 3 is a sectional view of the controlling valve mechanism for the actuator, illustrated in Fig. 1.

In the drawing we have shown our invention applied to a brake system for an automotive vehicle in connection with a power actuator of the type in which the piston is normally maintained submerged in atmosphere, (or in other words the higher fluid pressure) when in the released or off position. The power actuator consists in this instance of a cylinder, 1, open to the atmosphere at one end and closed at the other end, and having a piston, 3, in the cylinder operatively connected with brake mechanisms of the vehicle, indicated as a whole at B, which may be of any desired type, but which are shown, for example, as comprising each a brake drum, 70, brake band, 71, brake applying lever, 72, having a retracting spring, 73, said brake lever being connected by a link rod, 74, with arms, 75, on a rock shaft, 76, having an arm, 75ᵃ, connected with a piston rod, 5, of the piston, 3.

The actuator is provided with means for connecting the cylinder between the piston and the closed end of the cylinder with a source of suction and with a source of higher fluid pressure under the control of suitable controlling valve mechanism, which may be of any desired type. In this instance we have shown the controlling valve mechanism located exterior to the actuator, in linkage between the operator operated part and the brake mechanisms, and comprising a valve casing, 10, connected by a link rod, 78, with a foot lever, 80, having the usual retracting spring, 81, the valve casing being provided with oppositely disposed valves indicated at 42, 43, operatively connected with a hollow valve actuating part, 20, which is connected by a link, 77, with an arm, 75ᵇ, on the rock shaft, 76, thus connecting it with the piston, 3, and with the brake mechanisms. The particular construction of the valve mechanism herein shown is covered by our Letters Patent of the United States, No. 1,731,041, and forms no part of our present invention, and will not be further described in detail except to say that the relative movement of the valves with respect to the casing controls the actuator, and that the amount of lost motion between the valve actuating part and the valve casing is limited by suitable means, as collar, 28, on the part, 20, and an adjustable sleeve, 22, secured to the casing, to enable the operator to apply his physical force to the brake mechanisms in addition to that of the actuator, or to apply the brake mechanisms directly by physical force in case of failure of power. It will also be understood that the valves engage the valve actuating part, 20, with a sealing fit, and are normally pressed toward their seats by yielding means, as a spring, interposed between them, the part, 20, being provided with means for opening one valve after permitting the other to be closed when moved longitudinally in either direction. The hollow valve actuating part, 20, communicates with the valve casing between the valves by an aperture, 27, and communicates exteriorly of the valve casing with the cylinder forward of the piston by a flexible pipe, 15. The valve casing is provided with an inlet, 16, on one side of the valves for the higher pressure fluid, which in this instance communicates with the atmosphere, and said casing has an outlet aperture, 17, on the other side of the valves, communicating by suction pipe, 426, 426ᵃ, with the throttle controlled portion of the suction passage, 61, (as the intake manifold, 62) of an internal combustion engine, 60, for propelling the vehicle, being connected to the suction passage between the throttle valve, indicated at 63, and the engine cylinders, the suction passage being also provided with the usual carburetor, 64. Where desired, a vacuum storage tank, indicated at 26ᵇ, may be inserted in the suction line, as indicated in Fig. 1, and where used it will provide a vacuum storage sufficient to insure an emergency application of the brakes should the motor stall.

In the suction pipe or connection, 426, 426ᵃ, between the controlling valve mechanism for the actuator and the throttle controlled portion of the suction passage of the engine, is located an adjustable pressure regulating check valve, indicated as a whole at C in Figs. 1 and 2, the preferred form of which is shown in detail in the latter figure. The pressure regulating check valve comprises a hollow valve casing, 430, closed at one end and provided at the other end with a cap or cover, 431, screwed or otherwise secured thereto and having an air inlet aperture, 432, communicating with the atmosphere and a centrally located guiding sleeve, 433. The valve casing is provided with an outlet passage having a tubular portion or standpipe, 434, extending into the interior of the casing and forming what we term a partition member, which divides the interior of the valve casing into a chamber, 434ᵃ, within the tubular member or standpipe, and the chamber, 435, within the casing surrounding the standpipe. In this instance the standpipe is provided with a seat, 434ᵇ, at its inner extremity to be sealingly engaged by a seat portion, 437, secured to a flexible diaphragm, 436, or pressure operated member, which has its outer edges in sealing engagement with the valve casing and preferably clamped as shown by the cover, 431. The standpipe is also provided with an annular shoulder, indicated at 434ᶜ, which forms a second annular seat surrounding the seat, 434ᵇ, and adapted to be engaged by the inner edges of a flexible ring or annular check valve, 436ᵇ, having its outer marginal portions in sealing engagement with the outer edges of the casing and preferably clamped in engagement therewith by the cover, 431, a spacing ring or washer, 431ᵃ, being inserted between the outer edges of the ring, 436ᵇ, and the edges of the diaphragm, 436. The diaphragm, 436, is provided with a stem, 439, connected with the diaphragm and the reinforcing portion thereof, (if that is used) by an air-tight connection, said stem extending through the guiding aperture, 433, in the cover, and being connected with a spring, 450, provided with suitable means for adjusting the tension thereof. In this instance the spring is connected through a link, 50ª, with an adjusting lever, 51, provided with a spring actuated locking pawl, 52, segment, 53, and pawl releasing lever, 54. We also prefer to interpose an adjusting device between the spring, 450, and the hand operated device, as the lever, 51, and in this instance we have shown a threaded eye-bolt, 50ᵇ, provided with an adjusting nut, 50ᶜ, for connecting the spring, 450, with the link, 50ª. The stationary part, as the ratchet segment, 53, is conveniently provided with indications such as the words Dry    Slick    Ice
Loaded    Medium    Light for example, or other suitable indications, to indicate variations in the coefficient of friction between the vehicle wheels and the roadway. These variations may be due either to the condition of the road or the load condition of the vehicle to which the adjusted positions of the hand operated lever, 51, correspond and in which positions of the lever the tension of the spring will be such as to provide the desired maximum rarification for operating the brake mechanisms by power to the maximum extent of the actuator without locking the wheels to which the brake mechanisms are applied. The special adjusting means, 50ᵇ, 50ᶜ, permit of calibrating the spring to secure the desired tension thereof in the different positions of the hand regulating lever, 51. The hand regulating device or lever, 51, is located within convenient reach of the operator, for example on the dash or instrument board.

The chamber, 434ª, within the standpipe, 434, is connected by the suction pipe, 426, with the throttle controlled portion of the suction passage of the engine, and the chamber, 435, within the valve casing outside of the standpipe is connected by a pipe, 426, also forming with the pipe, 426, a part of the suction line, with the controlling valve mechanism for the actuator, in this instance through the vacuum storage tank, 26ᵇ. The diaphragm, 436, when the engine is in operation, is exposed to a differential of fluid pressures, to wit, the differential between the atmospheric pressure on its outer face and the sub-atmospheric pressure within the casing, 430, or within the standpipe, 434, or both. The tension of the spring, 450, tends to pull the diaphragm, 436, and its seat engaging portion, 437, in a direction away from the seat, 434ᵇ, at the inner end of the standpipe in opposition to the differential of fluid pressures acting on the diaphragm. If the hand operated lever, 51, is in such position that the spring, 450, exerts practically no tension on the diaphragm when the engine is running, and if the motor is then started and the throttle valve is closed, to produce rarification in the suction passage, 62, and the suction pipe, 426, and the chamber, 434ª, within the standpipe, 434. Air will also be exhausted from the surrounding chamber, 435, and the spaces connected therewith, through the pipe, 426ª, and in the vacuum storage tank, 26ᵇ, (if the latter is used) and when a comparatively slight degree of rarification is created within the chambers, 434ª and 435, the diaphragm, 436, will be moved inwardly by the air pressure on its outer face into engagement with the seat, 434ᵇ, thus cutting off the connection between the chamber, 435, and the suction passage of the engine, and a comparatively small degree of rarification will be maintained available for the operation of the actuator or actuators. As the tension of spring, 450, is increased by the adjustment of lever, 51, the diaphragm, 436, will be held unseated until the degree of rarification within the valve casing subjects the diaphragm to a differential of fluid pressures sufficient to overcome the tension of the spring, 450, as adjusted, and thus provide a greater degree of rarification available for the operation of the actuator.

The operator may, therefore, by adjusting the hand operated lever, 51, regulate the degree of rarification available for operating the suction actuated power actuator, and the maximum available rarification will be provided when the tension of the spring is substantially equal to the maximum differential of fluid pressures on the diaphragm, which amounts to approximately 10 pounds per square inch, that is to say, the difference between atmospheric pressure and the maximum rarification obtained in the intake manifold of the engine, which is represented approximately by 20 inches of mercury.

In this construction it is immaterial whether or not the relative cross-sectional areas of the chambers, 434ª and 435, are such that the differential of fluid pressure on the diaphragm will hold the valve portion, 437, seated in case of a rise of pressure in the standpipe or chamber, 434ª. Any rise of pressure within the standpipe above that in the chamber, 435, of the casing, if sufficient to unseat the diaphragm, 436, would immediately increase the pressure on the outer face of the annular check valve, 436ᵇ, and seat it upon its seat, 434ᶜ, so as to prevent any rise of pressure within the chamber, 435. Such a rise of pressure may occur, for example, when the throttle valve is more or less opened or should the engine stop. The apparatus, therefore, acts efficiently as a check valve and will maintain a sufficient degree of rarification within the chamber, 436, and the connected spaces for a sufficient time to hold the brakes as applied to stop the vehicle should the motor stall during or after an application of the brakes.

When a vacuum storage reservoir or tank is used as shown in Fig. 1, or where the actuator cylinder is normally maintained submerged in vacuum as shown in our former Letters Patent hereinbefore referred to, the vacuum will be held for an emergency application of the brakes even if the engine should stall or be stopped. The device will also prevent the gaseous mixture from being carried into the suction pipe, vacuum reservoir and connected spaces, by the fluctuations in the degree of rarification within the intake manifold, due to the opening and closing of the throttle valve, as for example when the throttle valve is opened fully after it has been previously closed and the maximum degree of rarification has been produced in the reservoir and its connections, which gaseous mixture might find its way into the cylinder of the actuator. If the gaseous mixture was not prevented from being drawn into the suction pipe, the accumulation of liquid fuel which would result might find its way into the suction actuated device and destroy the lubrication thereof and injure the valves and packings, and it might also cause an explosion in the pressure regulating check valve or in the suction actuated device should the motor backfire.

The pressure reguating check valve also prevents variations in the degree of rarification in the intake manifold from being transmitted through the controlling valve mechanism to the power actuator when the controlling valve mechanism is in a position to connect the power actuator with the suction passage, and the brakes are being applied by power of the actuator.

It will be understood that when it is desired to apply the brake mechanisms by power, assuming that the engine is running and the throttle valve closed or partly closed, the operator will depress the foot pedal, 80, and shift the valve casing and valves with respect to each other, so as to connect the actuator cylinder, 1, forward of the piston with the suction pipe, 426ª. Air will be withdrawn from the actuator cylinder, 1, into the chamber, 435, of the valve casing, 430, thereby increasing the pressure on the inner face of the diaphragm, 436, and reducing the differential of fluid pressures, tending to move the diaphragm against the tension of spring, 450. This permits the spring to draw the diaphragm outwardly away from its seat, placing the chamber, 435, in communicat'on with the chamber, 434ª, within the standpipe and continuing to withdraw the air from the cylinder of the actuator and the valve chamber, 435, until the rarification in said chamber increases to such a point that the differential of fluid pressures on the diaphragm overcomes the resistance of the spring as adjusted, whereupon the diaphragm will seat. The withdrawal of air from the actuator cylinder forward of the piston permits the pressure of the atmosphere on the rear face of the piston to move the piston forward and apply the brakes with a maximum force dependent upon the differential between the atmospheric pressure on the piston and the degree of rarification available to the actuator under the control of the pressure regulating check valve. It is obvious therefore, that by adjusting the tension of spring, 450, the maximum capacity of the suction actuated device to apply the brake mechanisms may be varied under the control of the operator independently of the controlling valve mechanism, 10.

The coefficient of friction between the tires of the wheels of the vehicle and the roadway varies considerably, due to conditions of the roadway, as to whether it is dry, or wet, or covered with snow or ice, for example, and also under varying loads supported by the wheels. It is very desirable not to permit the brakes to be applied with so much power as to lock the wheels, as the vehicle is caused to skid, and an accident may, and frequently does, result. Obviously a maximum braking power, which may be safely applied to the wheels of a loaded vehicle on a dry roadway, without danger of locking the wheels, will lock the wheels when the vehicle is lightly loaded, or is moving over wet or muddy, or snow or ice covered roads. It is desirable, therefore, that the operator be provided with just the amount of maximum available power the brakes require, without locking the wheels under these varying conditions, independently of the controlling valve mechanism for applying the brakes. It has, furthermore, been found desirable, and has become general practice with vacuum brake systems, to force the operator to do a certain amount of physical work, either while applying the brakes by power, or to supplement the power applications of the brakes with physical force for a full application of the brakes. In the latter case, the physical force exerted by the driver is directly applied to the brake mechanisms, in addition to the force being applied by the power cylinder connected therewith, with the result that on wet or icy streets, the operator will have very little feel of the amount of work being done by the brake cylinders, due to the fact that the chassis will be locked by power applications alone before any pressure has been built up on the pedal lever to resist and warn the operator. The danger of skidding is furthermore increased, due to the fact that the operator has little warning before the movement of his foot may apply the brakes with too much power. According to our present invention, the operator may reduce the force of the power actuator to any desired extent, so that he may have a full and natural feeling of resistance on the foot pedal without locking the wheels by power applications of the brakes, regardless of road conditions or load conditions, and there is therefore less danger of applying the brakes unintentionally with so much power as to lock the wheels. This is readily accomplished according to our invention, by adjusting the tension of the spring, 450, by means of the hand lever, 451, and its locking means, as before described.

What we claim and desire to secure by Letters Patent is:—

1. In a brake system for automotive vehicles, a combined pressure regulating and check valve adapted to control differentials of fluid pressure, comprising a valve casing having a chamber provided with means for connecting it with controlling valve mechanism, means providing an outlet passage, said last mentioned means having a tubular portion extending into said chamber, and open thereto at its inner end, an impervious pressure operated part forming a wall of said chamber, and provided with portions for closing said outlet passage to disconnect it from the said chamber, and having its outer face exposed at all times to the higher of differential fluid pressures, actuating said first mentioned valve mechanism thereby acting to move it toward its closed position, yielding means connected with said pressure operated part and tending to hold it in open position, the said tubular portion of said outlet means being provided with an annular seat at a distance from the portion engaged by the said pressure operated part, and a flexible annular check valve member in said chamber having its exterior marginal portions in sealing engagement with the walls of said chamber, and inner marginal portions for engaging the said annular seat, to separate said outlet passage from the said chamber by a rise of pressure in said passage above that in said chamber, and hand operated means accessible to the operator while the vehicle is moving, for varying the tension of said yielding means.

2. In a brake system for automotive vehicles, a combined pressure regulating and check valve, comprising a valve casing closed at one end, fluid transmitting connections extending from said casing, a tubular outlet member within said casing, open at its inner end and provided with an annular valve seat and a second annular valve seat in a different transverse plane from the first mentioned seat, said outlet member being connected with one of said fluid transmitting connections, means for connecting a portion of a second valve casing surrounding said outlet member with another of said fluid transmitting connections, a pressure operated part having marginal portions in sealing engagement with said casing, and central portions adapted to engage said first mentioned seat, yielding means connected with said pressure operated part acting thereon to hold it in unseated position, said pressure operated part having its outer face exposed at all times to the higher of differential fluid pressures actuating said first mentioned valve mechanism, a flexible annular check valve member having exterior marginal portions in sealing engagement with the valve casing and interior marginal portions in position to engage said second mentioned seat, said pressure operated part being held seated whenever the differential of fluid pressures thereon is sufficient to overcome said yielding means, whereby a substantially constant maximum differential of fluid pressures is maintained by said valve mechanism.

In testimony whereof we affix our signatures.

CALEB S. BRAGG.
VICTOR W. KLIESRATH.

CERTIFICATE OF CORRECTION.

Patent No. 1,908,400.             May 9, 1933.

CALEB S. BRAGG, ET AL.

It is hereby certified that error appears in the printed specification of the above numbered patent requiring correction as follows: Page 1, line 3, after "accompanying" insert the word "drawing"; page 5, lines 60 and 61, claim 2, for "a second" read "said"; and that the said Letters Patent should be read with these corrections therein that the same may conform to the record of the case in the Patent Office.

Signed and sealed this 22nd day of August, A. D. 1933.

(Seal)

M. J. Moore.
Acting Commissioner of Patents.